United States Patent
Yung

(10) Patent No.: US 8,512,839 B2
(45) Date of Patent: Aug. 20, 2013

(54) BLOW MOLDED ARTICLES AND PROCESS FOR MAKING SAME

(75) Inventor: Paul C. Yung, Cincinnati, OH (US)

(73) Assignee: Ticona LLC, Florence, KY (US)

( * ) Notice: Subject to any disclaimer, the term of this patent is extended or adjusted under 35 U.S.C. 154(b) by 39 days.

(21) Appl. No.: 13/157,778

(22) Filed: Jun. 10, 2011

(65) Prior Publication Data

US 2011/0305860 A1    Dec. 15, 2011

Related U.S. Application Data

(60) Provisional application No. 61/353,987, filed on Jun. 11, 2010.

(51) Int. Cl.
*B29C 47/00*    (2006.01)

(52) U.S. Cl.
USPC ................ 428/36.9; 138/137; 138/140

(58) Field of Classification Search
USPC ................... 428/36.9; 138/137, 140
See application file for complete search history.

(56) References Cited

U.S. PATENT DOCUMENTS

| | | | |
|---|---|---|---|
| 4,814,430 A | 3/1989 | Iwasaki et al. | |
| 4,889,893 A | 12/1989 | Kobayashi et al. | |
| 5,149,731 A * | 9/1992 | Uota et al. | 524/265 |
| 5,268,425 A * | 12/1993 | Furuta et al. | 525/68 |
| 5,380,783 A | 1/1995 | Satake et al. | |
| 5,418,281 A * | 5/1995 | Yung et al. | 524/602 |
| 5,625,002 A | 4/1997 | Kadoi et al. | |
| 5,840,830 A | 11/1998 | Miyahara et al. | |
| 6,645,623 B2 | 11/2003 | Dean et al. | |
| 7,271,212 B2 | 9/2007 | Oguni et al. | |
| 7,303,822 B1 | 12/2007 | Matsuoka et al. | |
| 7,385,013 B2 | 6/2008 | Kobayashi et al. | |
| 7,485,682 B2 | 2/2009 | Ajbani et al. | |
| 7,569,635 B2 | 8/2009 | Kojima et al. | |
| 7,591,505 B2 | 9/2009 | Onizawa et al. | |
| 2004/0266951 A1 * | 12/2004 | Akiyama et al. | 525/191 |
| 2007/0021549 A1 * | 1/2007 | Kojima et al. | 524/540 |
| 2008/0085963 A1 * | 4/2008 | Akiyama et al. | 524/406 |

FOREIGN PATENT DOCUMENTS

| | | |
|---|---|---|
| EP | 0 345 094 | 12/1989 |
| EP | 0 358 135 | 3/1990 |
| EP | 0 635 548 | 1/1995 |
| EP | 1 630 201 | 3/2006 |
| EP | 2 239 135 | 10/2010 |

OTHER PUBLICATIONS

European Search Report dated Jul. 12, 2012, 6 pages.
LOTADER AX 8840 data sheet, ARKEMA, Jul. 2005, 2 pages.
LOTADER AX 8840 data sheet, ARKEMA, Jul. 2004, 2 pages.
Silane coupling agents product information, Shin-Etsu Silicones, http://www.silicone.jp/e/products/type/silanecup/index.shtml, at least as early as May 27, 2010, 2 pages.

* cited by examiner

*Primary Examiner* — N. Edwards
(74) *Attorney, Agent, or Firm* — Dority & Manning, P.A.

(57) ABSTRACT

Blow molded articles are made from a polymeric composition containing a polyphenylene sulfide resin. The composition can further contain a reinforcing agent, such as glass fibers, and a combination of an organosilane coupling agent and an impact modifier. It was discovered that the combination of the aminosilane coupling agent and the impact modifier substantially increased the low shear viscosity and melt strength of the composition without increasing the high shear viscosity of the composition. The increase in the low shear viscosity makes the composition particularly well suited to molding articles with a complex shape. When producing blow molded articles, for instance, the composition provides better control over wall thickness while having improved interior surface smoothness at higher throughput and extrusion rates.

14 Claims, 2 Drawing Sheets

BLOW MOLDED ARTICLES AND PROCESS FOR MAKING SAME

RELATED APPLICATIONS

The present application claims priority to U.S. Provisional Patent Application No. 61/353,987, filed on Jun. 11, 2010, the contents of which are incorporated herein by reference thereto.

BACKGROUND

Various different high temperature engineering plastics exist that can be used to form different parts and articles. Such polymers include, for instance, polyarylene sulfide polymers. Polyarylene sulfide polymers are strong, have excellent chemical resistance, have high rigidity, and have good resistance to heat such that they can be used in high temperature applications. For example, polyarylene sulfide polymers can be used to replace metal parts at a fraction of the weight. In addition to being lighter, articles made from polyarylene sulfide polymers also produce less noise and are more resistant to chemical attack than many metals.

Polyarylene sulfide polymers are also thermoplastic in nature allowing them to be used in various molding processes, such as injection molding.

For instance, in the past, various molded parts have been produced from a composition containing a polyarylene sulfide polymer combined with glass fibers and an aminosilane. The above composition has proved very successful in producing various products, particularly made via injection molding. The above composition, however, also does have its limitations when used in particular molding processes, such as extrusion blow molding.

For example, when blow molding with fiber reinforced polyarylene sulfide resins, problems have been experienced in controlling and/or obtaining uniform wall thickness during forming of the parison. For instance, during complex blow molding operations, tubular members are formed that are constantly undergoing shape changes. In one application, for example, a parison is extruded in a downward direction while the polymeric composition remains at an elevated temperature. The polymeric composition is extruded through an annular opening or die until a desired length of the parison is obtained. The parison needs to maintain uniform wall thickness while it is being extruded and resist stretching or elongation under only its own weight until a desired length is obtained to begin blow molding. The parison may also be maneuvered for example by a robot during extrusion to change the angular displacement of the tubular form to a specific shape.

The mold closes onto the tubular form once the desired length is attained and a needle is inserted at one end of the closed parison to allow a gas or air to be injected into the tubular form to blow mold the article into its final shape. During the above process, past compositions containing a polyarylene sulfide resin had a tendency to sag during the process and changes the thickness of the parison inadvertently. Sagging is a low shear phenomenon and is affected by the melt strength or melt elasticity of the polymeric composition.

In this regard, the present disclosure is directed to fiber reinforced polymeric compositions containing a polyarylene sulfide polymer that are capable of forming molded parts having a complex shape. More particularly, the present disclosure is directed to a fiber reinforced polyarylene sulfide composition that is more amenable for use in extrusion and blow molding processes for producing parts with complex shapes and enables excellent control of wall thickness.

SUMMARY

In general, the present disclosure is directed to a fiber reinforced polyarylene sulfide composition that is well suited for use in molding processes, particularly blow molding processes for producing parts having a relatively complex shape. The composition has been found to provide excellent control over wall thickness during blow molding of hollow members, such as tubular members that have a significant number of angular variations and/or have a substantial length. The fiber reinforced polymeric composition of the present disclosure also allows for the molding of complex shaped parts without any deterioration in the physical properties of the part. In fact, some properties of the part may actually be improved when using the composition of the present disclosure.

In one embodiment, for instance, the present disclosure is directed to a shaped polymer article comprising a blow molded hollow member having an interior surface and an exterior surface. The hollow member is made from a fiber reinforced polymeric composition comprising a polyarylene sulfide resin. The polyarylene sulfide resin, for instance, may comprise a linear polyphenylene sulfide resin having a melt viscosity of from about 20 Pa·s to about 500 Pa·s at 310° C. and at 1200 s$^{-1}$. The composition further contains reinforcing fibers present in an amount from about 10% to about 50% by weight. The reinforcing fibers may comprise, for instance, glass fibers. The composition further contains an organosilane coupling agent and a reactive impact modifier. The organosilane coupling agent is present in the composition in an amount from about 0.1% to about 2% by weight.

The reactive impact modifier is reactive with the organosilane coupling agent and/or with the polyarylene sulfide resin. The reactive impact modifier is present in the composition in an amount from about 0.5% by weight to an upper limit whereby the shaped article exhibits a deflection temperature under load (DTUL) of at least 200° C. (at 1.8 MPa). As used herein, DTUL is measured according to ISO Test No. 75-1,-2.

It was unexpectedly discovered that the reactive impact modifier can increase the low shear viscosity of the composition without a corresponding increase in the high shear viscosity of the composition. In particular, the reactive impact modifier may be present in the composition such that the composition has a low shear melt viscosity measured at 1 s$^{-1}$ of from about 15,000 Pa·s to about 85,000 Pa·s at 310° C. when measured with a Kayaness capillary rheometer.

Increasing the low shear viscosity of the composition as described above provides various benefits and advantages. For instance, increasing the low shear viscosity provides better control of the composition during molding. Ultimately, blow molded articles can be produced that have uniform wall thickness. In addition to controlling wall thickness, inclusion of the reactive impact modifier into the composition provides for high extrusion rates and interior surface smoothness. In addition, the composition provides better processability, higher throughput and lower scrap rate than compositions used in the past containing a polyarylene sulfide polymer.

Of particular advantage, it was discovered that the impact modifier can be present in the fiber reinforced polymer composition such that a slope of the log melt viscosity measured between 1 s$^{-1}$ and 400 s$^{-1}$ using a Kayaness capillary rheometer at 310° C. is decreased by at least 20%, such as by at least 30% in comparison to a similar composition not containing the impact modifier. In one embodiment, for instance, the slope of the log melt viscosity versus the log shear rate is less than −0.45. For instance, in one embodiment, the slope of the log melt viscosity versus the log shear rate may be from about −0.5 to about −0.7.

In addition to measuring low shear viscosity using a Kayaness capillary rheometer, the low shear viscosity can also be measured using an Ares parallel plate rheometer. In this regard, a composition made in accordance with the present disclosure can have a melt viscosity of greater than 7,500 Pa·s, such as greater than 18,000 Pa·s at 0.1 radian/s at 310° C. and can have a melt viscosity of greater than 4,000 Pa·s at 1.0 radian/s at 310° C. when using the Ares parallel plate rheometer.

In one embodiment, the impact modifier used in accordance with the present disclosure comprises a random copolymer of a polyolefin and glycidyl methacrylate. In one particular embodiment, for instance, the impact modifier may comprise a random copolymer of polyethylene and glycidyl methacrylate wherein the glycidyl methacrylate is present in the copolymer in an amount from about 6% to about 10% by weight. The impact modifier may have a functionality that is preferably reactive to both the polyphenylene sulfide polymer and the organofunctional silane. The preferred functionality includes epoxy, anhydride, acid, oxalazone, amine, glycidyl methacrylate and may be in the range of 0.5 to 20 weight percent.

The organosilane coupling agent may comprise a silane coupling agent. In one embodiment, for instance, the organosilane coupling agent may comprise 3-aminopropyltrimethoxysilane and/or 3-aminopropyltriethoxysilane.

In addition to unexpectedly increasing the low shear viscosity of the composition, the impact modifier also does increase the impact resistance of the composition. For instance, the shaped polymer article may have an impact resistance of greater than 5 kJ/m$^2$ according to the notched Izod test. As used herein, the notched Izod test is conducted according to ISO Standard 180/1A.

As described above, the impact modifier increases the low shear viscosity of the composition without increasing the high shear viscosity of the composition to the same extent. In this regard, the fiber reinforced composition may have a melt viscosity of from about 600 Pa·s to about 1200 Pa·s when measured at 400 s$^{-1}$ and at 316° C.

Other features and aspects of the present disclosure are discussed in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Figure 1:
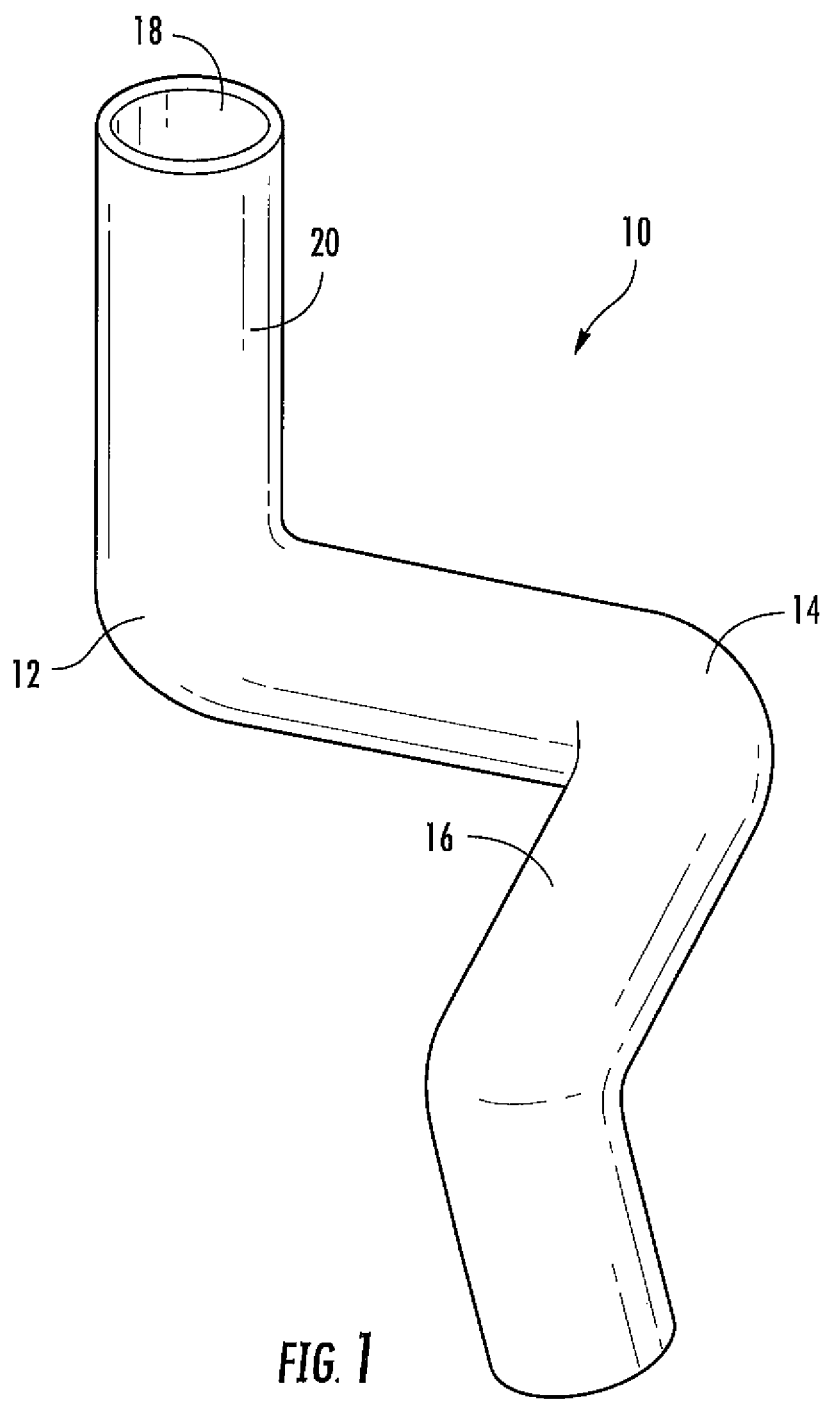
FIG. 1 is a perspective view of one embodiment of a shaped article that may be made in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to a fiber reinforced polymeric composition particularly well suited for producing molded parts having a complex shape. In the past, for instance, when blow molding reinforced polyarylene sulfide resins, problems were experienced in controlling or obtaining uniform wall thickness during forming of the parison due to insufficient melt strength. It was unexpectedly discovered, however, that by incorporating into a composition containing reinforcing fibers and a polyarylene sulfide resin a combination of an organosilane coupling agent with an impact modifier significantly increases the processability of the composition providing excellent control over wall thickness during extrusion and blow molding. In particular, it was discovered that the organosilane coupling agent synergistically reacts with the impact modifier to significantly increase the low shear viscosity and the melt strength of the composition. The synergistic effect enables significantly improved control during blow molding for producing products having controlled wall thickness with surface smoothness at relatively high extrusion rates. Of particular advantage, the above benefits are obtained while not increasing the high shear viscosity of the composition to a degree that would otherwise negatively impact molding due to the presence of melt fractures and/or an increase in surface roughness or limit the rate of extruding the parison.

The polyarylene sulfide resin that may be used in the composition of the present disclosure can vary depending upon the particular application and the desired results. Polyarylene sulfide resins that may be used are comprised of repeating units represented by the formula —(—Ar—S—)—, wherein Ar is an arylene group.

Examples of arylene groups that can be present in the polyarylene sulfide resin include p-phenylene, m-phenylene, o-phenylene and substituted phenylene groups (wherein the substituent is an alkyl group preferably having 1 to 5 carbon atoms or a phenyl group), p,p'-diphenylene sulfone, p,p'-biphenylene, p,p'-diphenylene ether, p,p'-diphenylenecarbonyl and naphthalene groups.

Polyarylene sulfides that may be used, in one embodiment, include polyarylene thioethers containing repeat units of the formula:

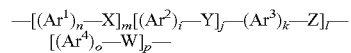

wherein Ar$^1$, Ar$^2$, Ar$^3$, and Ar$^4$ are the same or different and are arylene units of 6 to 18 carbon atoms; W, X, Y, and Z are the same or different and are bivalent linking groups selected from —SO$_2$—, —S—, —SO—, —CO—, —O—, —COO— or alkylene or alkylidene groups of 1 to 6 carbon atoms and wherein at least one of the linking groups is —S—; and n, m, i, j, k, l, o, and p are independently zero or 1, 2, 3, or 4, subject to the proviso that their sum total is not less than 2. The arylene units Ar$^1$, Ar$^2$, Ar$^3$, and Ar$^4$ may be selectively substituted or unsubstituted. Arylene units include phenylene, biphenylene, naphthylene, anthracene and phenanthrene. The polyarylene sulfide can include at least 30 mole percent, particularly at least 50 mole percent and more particularly at least 70 mole percent arylene sulfide (—S—) units. The polyarylene sulfide polymer can include at least 85 mole percent sulfide linkages attached directly to two aromatic rings.

In one embodiment, the polyarylene sulfide polymer is polyphenylene sulfide (PPS), defined herein as containing the phenylene sulfide structure —(C$_6$H$_4$—S)$_n$— (wherein n is an integer of 1 or more) as a component thereof.

Synthesis techniques that can be used in making polyphenylene sulfide resins that are suitable for utilization in the practice of this invention are described in U.S. Pat. Nos.

4,814,430, 4,889,893, 5,380,783, and 5,840,830, the teachings of which are incorporated herein by reference in their entirety.

The polyarylene sulfide polymer may have a linear configuration or a branched configuration. In one embodiment, however, a linear polymer is used. Although unknown, it is believed that the linear polymer may coordinate better with the organosilane coupling agent and the impact modifier.

The polyarylene sulfide polymer selected for use in the composition of the present disclosure can depend on various factors. For instance, in general a polyarylene sulfide polymer should be chosen that is compatible with the molding process, such as a blow molding process and is compatible with the other components contained in the composition. In general, for instance, the polyarylene sulfide polymer can have a melt viscosity of from about 20 Pa·s to about 500 Pa·s (from about 200 poise to about 5,000 poise). As used herein, melt viscosity of the polyarylene sulfide polymer is determined in accordance with the ASTM Test No. 1238-70 at 316° C. and at 1200 $s^{-1}$.

A polyarylene sulfide polymer selected for use in the present disclosure may also have a relatively low chlorine content. In general, lower melt viscosity polymers generally have a greater chlorine content. Thus, a balance may be struck between selecting a polymer having an appropriate melt viscosity while also selecting a polymer that has a low chlorine content. In one embodiment, the polyarylene sulfide polymer may have a chlorine content of less than about 2000 parts per million for generating a composition with a chlorine content of less than 900 parts per million.

The polyarylene sulfide polymers may be polyphenylene sulphide and may have a branched or crosslinked microstructure. Branching may be achieved by copolymerizing with a trifunctional monomer such as trichlorobenzene in a molar weight proportion of 0.1 to 6%. Branching may be obtained by first obtaining a linear polymer with the difunctional monomer which is then solid stated to a higher molecular weight by heating the polymer in air or air/nitrogen mixture and at temperatures between the glass transition temperature (80° C.) and melting point transition (275° C.) for an extended time. When high level of branching is achieved, the viscosity of the polyphenylene sulfide may be very high.

Polyarylene sulfide polymers that may be used in the present disclosure are available from numerous commercial sources. In one embodiment, for instance, polymers can be purchased from Ticona LLC and/or the Celanese Corporation under the trade name FORTRON. Selection of a suitable polyarylene sulfide polymer for use in the present disclosure is generally dependent upon obtaining the desired low shear viscosity when used in conjunction with the silane coupling agent and the impact modifier.

In one embodiment, a polyarylene sulfide polymer having a relatively high melt viscosity can be combined with a polyarylene sulfide polymer having a relatively low melt viscosity for producing a PPS polymer having the desired characteristics.

The polymeric composition can also contain a reinforcing agent, such as reinforcing fibers or mineral fillers. In one embodiment, for instance, the resin composition may contain glass reinforcing fibers. Any suitable glass fibers may be included in the composition. In one embodiment, for instance, the fibers may be comprised of lime-aluminum borosilicate glass.

Other reinforcing fibers that may be used in accordance with the present disclosure include carbon fibers, metal fibers, aromatic polyamide fibers, rockwool fibers, shape memory alloy fibers, boron fibers, poly(p-phenylene-2,6-benzobisoxazole) fibers, and mixtures thereof. Carbon fibers that may be used include amorphous carbon fibers, graphitic carbon fibers, or metal-coated carbon fibers. Metal fibers may include stainless steel fibers, aluminum fibers, titanium fibers, magnesium fibers, tungsten fibers, and the like.

Fiber diameters can vary depending upon the particular fiber used and are available in either chopped or continuous form. The reinforcing fibers, for instance, can have a diameter of less than about 100 microns, such as less than about 50 microns. For instance, chopped or continuous fibers can have a fiber diameter of from about 5 microns to about 50 microns, such as from about 5 microns to about 15 microns. If desired, the fibers may be pretreated with a sizing that may also facilitate mixing with the polymer. Fiber lengths can be controlled by one skilled in the art during compounding varying compounding conditions (e.g. temperature profile, rate and shear or screw speed) and screw design (control intensity of mixing) used to mix and/or disperse the fiber in the polymeric composition. In one embodiment, for instance, the fibers can have an initial length of from about 3 mm to about 5 mm while the final length after compounding could vary from 100 microns to 1500 microns depending on choice of compounding conditions and screw design used in compounding.

The reinforcing fibers can be present within the resulting article in an amount from about 10% to about 50% by weight, such as from about 10% to about 25% by weight.

Suitable mineral fillers that may be included in the resin composition include talc, clay, silica, calcium silicate, calcium sulfate, barium sulfate, mica, calcium carbonate, titanium dioxide, mixtures thereof, and the like. The fillers may be present in the composition in the amount from about 0.5% to about 30% by weight, such as from about 5% to about 25% by weight.

In addition to a polyarylene sulfide polymer and a reinforcing agent, the composition of the present disclosure further contains a combination of an organosilane coupling agent and an impact modifier. It is believed that the silane coupling agent chemically reacts with the polyarylene sulfide polymer and also reacts with the impact modifier. In accordance with the present disclosure, it was unexpectedly discovered that the combination of the organosilane coupling agent with the impact modifier surprisingly increases the low shear viscosity and melt strength of the composition.

The organosilane coupling agent, in one embodiment, contains at least two different reactive groups within each molecule. The two different reactive groups allow for not only attachment to the polyarylene sulfide resin but also attachment to the impact modifier and produce a reaction product or graft molecules amongst the polyphenylene sulfide, impact modifier, and silane.

Exemplary organosilane incorporated according to the invention are described in U.S. Pat. No. 5,149,731, the teachings of which are incorporated herein by reference in their entirety. The included organosilanes are selected from the group consisting of a vinylalkoxysilanes, epoxyalkoxysilanes, aminoalkoxysilanes, and mercaptoalkoxysilanes. Examples of the vinylalkoxysilane that can be utilized include vinyltriethoxysilane, vinyltrimethoxysilane and vinyltris(β-methoxyethoxy)silane. Examples of the epoxyalkoxysilanes that can be used include γ-glycidoxypropyltrimethoxysilane, β-(3,4-epoxycyclohexyl)ethyltrimethoxysilane and γ-glycidoxypropyltriethoxysilane. Examples of the mercaptoalkoxysilanes that can be employed include γ-mercaptopropyltrimethoxysilane and γ-mercaptopropyltriethoxysilane.

Amino functional silane compounds are preferred and typically of the formula: $R^1-Si-(R^2)_3$, wherein $R^1$ is selected from the group consisting of an amino group such as $NH_2$; an aminoalkyl of from about 1 to about 10 carbon atoms, preferably from about 2 to about 5 carbon atoms, such as aminomethyl, aminoethyl, aminopropyl, aminobutyl, and the like; an alkene of from about 2 to about 10 carbon atoms, preferably from about 2 to about 5 carbon atoms, such as ethylene, propylene, butylene, and the like; and an alkyne of from about 2 to about 10 carbon atoms, preferably from about 2 to about 5 carbon atoms, such as ethyne, propyne, butyne and the like; and wherein $R^2$ is an alkoxy group of from about 1 to about 10 atoms, preferably from about 2 to about 5 carbon atoms, such as methoxy, ethoxy, propoxy, and the like. In a preferred embodiment, in the amino functional silane compound of the $R^1$—Si—$(R^2)_3$, $R^1$ is selected from the group consisting of aminomethyl, aminoethyl, aminopropyl, ethylene, ethyne, propylene and propyne, and $R^2$ is selected from the group consisting of methoxy groups, ethoxy groups, and propoxy groups.

It is typically preferred for the amino silane compound to be of the formula: $R^3$—Si—$(R^4)_3$ wherein $R^3$ is an amino group such as $NH_2$ or an aminoalkyl of from about 1 to about 10 carbon atoms such as aminomethyl, aminoethyl, aminopropyl, aminobutyl, and the like, and wherein $R^4$ is an alkoxy group of from about 1 to about 10 atoms, such as methoxy groups, ethoxy groups, propoxy groups, and the like. It is also preferred for the amino silane to be of the formula: $R^5$—Si—$(R^6)_3$ wherein $R^5$ is selected from the group consisting of an alkene of from about 2 to about 10 carbon atoms such as ethylene, propylene, butylene, and the like, and an alkyne of from about 2 to about 10 carbon atoms such as ethyne, propyne, butyne and the like, and wherein $R^6$ is an alkoxy group of from about 1 to about 10 atoms, such as methoxy group, ethoxy group, propoxy group, and the like. The amino silane can be a mixture of various compounds of the formula $R^1$—Si—$(R^2)_3$, $R^3$—Si—$(R^4)_3$, and $R^5$—Si—$(R^6)_3$.

Specific representative examples of amino functional silane compounds include aminopropyl triethoxy silane, aminoethyl triethoxy silane, aminopropyl trimethoxy silane, aminoethyl trimethoxy silane, ethylene trimethoxy silane, ethylene triethoxy silane, ethyne trimethoxy silane, ethyne triethoxy silane, aminoethylaminopropyltrimethoxy silane, 3-aminopropyl triethoxy silane, 3-aminopropyl trimethoxy silane, 3-aminopropyl methyl dimethoxysilane or 3-aminopropyl methyl diethoxy silane, N-(2-aminoethyl)-3-aminopropyl trimethoxy silane, N-methyl-3-aminopropyl trimethoxy silane, N-phenyl-3-aminopropyl trimethoxy silane, bis(3-aminopropyl)tetramethoxy silane, bis(3-aminopropyl) tetraethoxy disiloxane, and combinations thereof. The amino silane can also be an aminoalkoxysilane, such as γ-aminopropyltrimethoxysilane, γ-aminopropyltriethoxysilane, γ-aminopropylmethyldimethoxysilane, γ-aminopropylmethyldiethoxysilane, N-(β-aminoethyl)-γ-aminopropyltrimethoxysilane, N-phenyl-γ-aminopropyltrimethoxysilane, γ-diallylaminopropyltrimethoxysilane and γ-diallylaminopropyltrimethoxysilane. A highly preferred amino silane is 3-aminopropyltriethoxysilane which is available from Degussa, Sigma Chemical Company, and Aldrich Chemical Company.

The amount of organosilane coupling agent present within the polymeric composition may depend on various factors including the relative amounts of the other ingredients and the particular organosilane coupling agent utilized. In one embodiment, for instance, the organosilane coupling agent may be present in the composition in an amount from about 0.1% to about 2% by weight, such as from about 0.4% to about 1% by weight. In one embodiment, when the composition contains from about 10% by weight to about 20% by weight reinforcing fibers, the composition contains the organosilane coupling agent in an amount from about 0.4% to about 1% by weight.

As described above, the organosilane coupling agent is added to the polymeric composition in conjunction with an impact modifier. In one embodiment, an impact modifier is selected that is chemically reactive with the organosilane coupling agent. In one embodiment, for instance, the impact modifier may comprise a random copolymer of a polyolefin and glycidyl methacrylate. For instance, in one embodiment, the impact modifier may comprise a random copolymer of polyethylene and glycidyl methacrylate. The amount of glycidyl methacrylate contained in the random copolymer may vary. In one particular embodiment, the random copolymer contains the glycidyl methacrylate in an amount from about 6% to about 10% by weight.

In the past, impact modifiers have been combined with various thermoplastic polymers in order to increase the impact resistance of molded parts made from the polymers. It was discovered, however, that the above impact modifier synergistically combines with the organosilane coupling agent and the polyphenylene sulfide resin so as to raise the low shear viscosity and melt strength of the composition. Thus, in one embodiment, the impact modifier is present in the composition in an amount sufficient to raise the low shear viscosity of the composition without having any substantial adverse impact on other properties of the composition, such as the DTUL properties. For instance, in one embodiment, the impact modifier may be present in the composition in an amount sufficient to increase the low shear viscosity while maintaining the DTUL at greater than about 200° C.

The low shear viscosity of the polymeric composition can be measured using a Kayaness capillary rheometer or by using an Ares parallel plate rheometer. In one embodiment, for instance, the impact modifier is present in the composition such that the composition has a low shear melt viscosity measured at 1 $s^{-1}$ of from about 15,000 Pa·s to about 85,000 Pa·s at 310° C. when using the Kayaness capillary rheometer. When measured with the Kayaness capillary rheometer, the composition may also have a melt viscosity of greater than about 600 Pa·s when measured at 400 $s^{-1}$ at 310° C.

When measured according to the Ares parallel plate rheometer, the composition can exhibit a melt viscosity of greater than about 7,500 Pa·s at 0.1 radian/s at 310° C. In addition, the composition can display a melt viscosity of greater than about 4,000 Pa·s at 1.0 radian/s at 310° C., such as a melt viscosity of from about 4,000 Pa·s to a melt viscosity of about 8,000 Pa·s at the above conditions.

The impact modifier increases the low shear melt viscosity of the composition by increasing the slope of the log of melt viscosity versus the log of the shear rate. For instance, as will be demonstrated in the example below, the slope of the log melt viscosity versus the log shear rate can decrease by greater than 20%, such as even greater than 30%. For instance, in one embodiment, the slope of the log melt viscosity versus the log shear rate can be less than about −0.45. In one embodiment, for instance, the log of the melt viscosity versus the log of the shear rate can be from about −0.5 to about −0.7 when measured between a shear rate of 1 $s^{-1}$ and 400 $s^{-1}$ using the Kayaness capillary rheometer at 310° C.

Increasing the low shear viscosity of the fiber reinforced polymeric composition offers various advantages and benefits, especially when using the composition to mold complex shapes. Increasing the low shear viscosity, for instance, provides better control of the polymer during extrusion or molding of the parison. For instance, the composition of the present disclosure enables extrusion blow molding of articles with uniform wall thickness and smooth interior surfaces. In addition, the polymeric composition allows for high extrusion rates. Due to the improved processability of the composition, the composition leads to higher throughput at a lower scrap rate than a comparative product not containing the impact modifier in the amounts described.

Of particular advantage, incorporating the organosilane coupling agent and the impact modifier into the composition raises the low shear viscosity and melt strength of the composition without a corresponding increase in the high shear viscosity of the composition. Increasing the high shear viscosity of the composition, for instance, may negatively impact the extrusion rate due to premature melt fracture and increases in surface roughness, such as at melt viscosities greater than 1500 Pa·s at 400 s$^{-1}$ and at 316° C.

In addition to the above advantages, incorporation of the impact modifier into the polymeric composition also increases the impact resistance of an article made from the composition. For instance, a shaped article made in accordance with the present disclosure may have an impact resistance that is at least 20%, such as even 30% greater than the impact resistance of a composition not containing the impact modifier. In one embodiment, for instance, a shaped article made in accordance with the present disclosure may have a notched Izod impact resistance of greater than 7 kJ/m$^2$, such as from about 7 kJ/m$^2$ to about 10 kJ/m$^2$. The above impact resistance properties can be measured according to ISO Test 180.

Referring to FIG. 1, one embodiment of a shaped article made in accordance with the present disclosure is shown. As shown, in this embodiment, the shaped article comprises a tubular member 10. The tubular member 10 can be made according to a blow molding process. As shown, the tubular member 10 extends in multiple directions leading to a relatively complex shape. For instance, before the polymeric composition can solidify, the angular displacements as shown in FIG. 1 are formed into the part. The tubular member 10 includes angular displacement changes at 12, 14 and 16. The tubular member 10 may comprise, for instance, an auto part that may be used in the exhaust system of a vehicle. As shown, the tubular member 10 includes an interior surface 18 and an exterior surface 20. During blow molding, a pressurized gas, such as an inert gas, is forced against the interior surface of the tubular member. The increase in low shear viscosity allows the extrusion of the parison with uniform wall thickness and without the polymer creating melt fractures or other imperfections.

The process for making the tubular member 10 as shown in FIG. 1 can vary. In one embodiment, for instance, the polymeric composition of the present disclosure can be extruded into a parison using a die. The parison is typically extruded in a downward direction. When the parison reaches a desired length, a nozzle or pin is inserted into an open end of the parison to inflate the parison and mold the parison into a desired shape. In one embodiment, robot arms can be used to move the parison during the blow molding process in order to form the angular displacements.

Once the part is molded, cool air can be injected into the tubular member for solidifying the polymer.

The present disclosure may be better understood with reference to the following example.

EXAMPLE

A composition was formulated in accordance with the present disclosure. The composition contained a polyphenylene sulfide resin, glass fibers, an organosilane coupling agent and an impact modifier. A similar composition was also formulated that did not contain the impact modifier. Both compositions were then tested for melt viscosity at low shear.

The composition formulated in accordance with the present disclosure contained the following components.

1. Polyphenylene sulfide resin having a melt viscosity of 140 Pa·s measured at 1200 s$^{-1}$ at 316° C. was present in the composition in an amount of about 81.9% by weight.
2. Glass fibers having an average diameter of 10 microns were present in an amount at 15% by weight.
3. An aminosilane coupling agent was present in the composition in an amount of 0.6% by weight. The silane coupling agent was product number KBE-903 commercially available from the Shin-Etsu Chemical Company.
4. An impact modifier was present in the composition in an amount of 2.5% by weight. The impact modifier comprised a random copolymer of ethylene and glycidyl methacrylate wherein the glycidyl methacrylate content was 8% by weight.

For comparative reasons, a similar composition was formulated that did not contain the impact modifier. Thus, the polyphenylene sulfide resin was present in an amount of about 82.5% by weight.

The two compositions were then tested for melt viscosity at a shear rate of 1 s$^{-1}$ at 310° C. and at a shear rate of 400 s$^{-1}$ at 310° C. using a Kayaness capillary rheometer. The following results were obtained:

| Shear Rate | Comparative Composition | Sample No. 1 |
| --- | --- | --- |
| 1 s$^{-1}$ | 7830 | 25,269 |
| 400 s$^{-1}$ | 628 | 914 |

Figure 2:
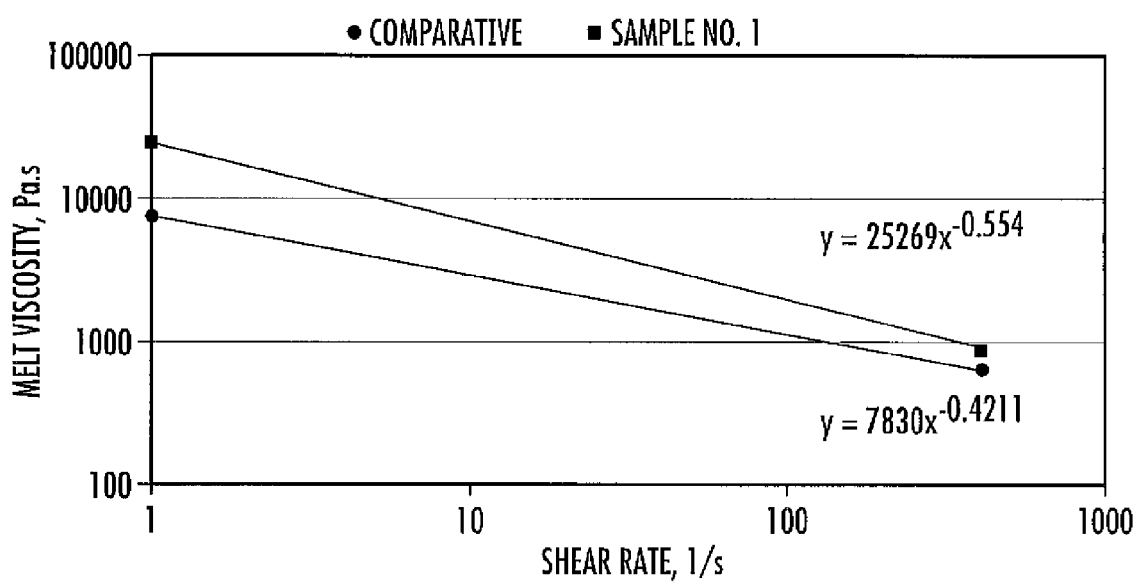
FIG. 2 is a graphical representation of the results obtained in the example described below.

The log of melt viscosity versus the log of shear rate are also illustrated in FIG. 2. As shown in FIG. 2, the slope of the comparative sample was approximately −0.42, while the slope of the composition made in accordance with the present disclosure (Sample No. 1) had a slope of −0.55. Thus, the slope of Sample No. 1 decreased by greater than 20%, and even greater than 30% than the slope of the control.

The melt elasticity (G'), a measure of melt strength, of Sample 1 as determined on Ares at 310° C. and 1 radian/sec also confirmed that the sample is significantly higher than the comparative example by over 250%.

| | Comparative Example | Sample 1 |
| --- | --- | --- |
| Melt Elasticity (G'), Pa | 1431 | 3767 |

In addition, various other properties of Sample No. 1 were tested. In particular, the composition of Sample No. 1 exhibited a tensile strength at break of 115 MPa (ISO 527), an elongation at break of 2.5% (ISO 527), a tensile modulus of 6700 MPa (ISO 527), a flexural strength at break of 190 MPa (ISO 178), a flexural modulus of 6500 MPa (ISO 178) and a notched Izod impact of 7 kJ/m$^2$ (ISO 180/1A). The composition also exhibited a DTUL at 1.8 MPa of 210° C. (ISO 75).

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A shaped polymer article comprising:

a blow molded hollow member including a layer with an interior surface and an exterior surface and having a wall thickness between the interior surface and the exterior surface, the layer being made from a fiber reinforced polymeric composition comprising, on a weight percent basis:
a) a linear polyphenylene sulfide having a melt viscosity of from about 20 Pa·s to about 500 Pa·s;
b) reinforcing fibers present in the composition in an amount from about 10% to about 50% by weight;
c) an organosilane coupling agent present in the composition in an amount from about 0.1% to about 2% by weight;
d) a reactive impact modifier reactive with the organosilane coupling agent, the reactive impact modifier being present in an amount from about 0.5% to about 20% by weight, whereby the fiber reinforced polymeric composition exhibits a DTUL of at least 200° C. and a low shear melt viscosity measured at 1 $s^{-1}$ of from 15,000 Pa·s to 85,000 Pa·s at 310° C. measured with a Kayaness capillary rheometer, wherein the member comprises angles in multiple directions.

2. A shaped polymer article as defined in claim 1, wherein the impact modifier is present in the fiber reinforced polymeric composition such that a slope of the log melt viscosity measured between 1 $s^{-1}$ and 400 $s^{-1}$ using a Kayaness capillary rheometer at 310° C. is decreased by at least 20% in comparison to a similar composition not containing the impact modifier.

3. A shaped polymer article as defined in claim 1, wherein the impact modifier comprises a random copolymer of a polyolefin and a glycidyl methacrylate.

4. A shaped polymer article as defined in claim 3, wherein the impact modifier comprises a random copolymer of polyethylene and the glycidyl methacrylate, the glycidyl methacrylate being present in the impact modifier in an amount from about 6% to about 10% by weight.

5. A shaped polymer article as defined in claim 1, wherein the organosilane coupling agent comprises an aminosilane.

6. A shaped polymer article as defined in claim 5, wherein the aminosilane comprises 3-aminopropyltrimethoxysilane or comprises 3-aminopropyltriethoxysilane.

7. A shaped polymer article as defined in claim 2, wherein the slope of the log melt viscosity versus the log shear rate is less than −0.45.

8. A shaped polymer article as defined in claim 2, wherein the slope of the log melt viscosity versus the log shear rate is from −0.5 to −0.7.

9. A shaped polymer article as defined in claim 1, wherein the fiber reinforced polymeric composition has a melt viscosity of from about 20,000 Pas to about 30,000 Pa·s at 1 $s^{-1}$ at 310° C. when measured using a Kayaness capillary rheometer.

10. A shaped polymer article as defined in claim 1, wherein the impact modifier is present in the fiber reinforced polymeric composition such that a slope of the log melt viscosity measured between 1 $s^{-1}$ and 400 $s^{-1}$ using a Kayaness capillary rheometer at 310° C. is decreased by at least 30% in comparison to a similar composition not containing the impact modifier.

11. A shaped polymer article as defined in claim 1, wherein the fiber reinforced polymeric composition has a melt viscosity of greater than 7,500 Pa·s at 0.1 radian/s at 310° C. and greater than 4,000 Pa·s at 1.0 radian/s at 310° C. when measured using an Ares parallel plate rheometer.

12. A shaped polymer article as defined in claim 1, wherein the article has an impact strength according to the notched Izod impact test of at least about 7 kJ/m$^2$.

13. A shaped polymer article as defined in claim 1, wherein the fiber reinforced polymeric composition has a melt viscosity of from about 600 Pa·s to about 1200 Pa·s at 400 $s^{-1}$ at 316° C.

14. A shaped polymer article as defined in claim 1, wherein the organosilane coupling agent is present in the composition in an amount from about 0.4% to about 1% by weight.

* * * * *